United States Patent [19]

De Boer

[11] 3,729,579

[45] Apr. 24, 1973

[54] CONVERTING CIRCUIT FOR A LINE-SEQUENTIAL TELEVISION SIGNAL RECORDING DEVICE

[75] Inventor: Jacob De Boer, Emmasingel, Eindhoven, Netherlands

[73] Assignee: North American Philips Co., Inc., New York, N.Y.

[22] Filed: July 26, 1971

[21] Appl. No.: 166,273

Related U.S. Application Data

[63] Continuation of Ser. No. 759,703, Sept. 13, 1968, abandoned.

[52] U.S. Cl. ........................... 178/5.4 CD, 178/5.4 C

[51] Int. Cl. ........................................ H04n 9/02

[58] Field of Search ..................... 178/5.4, 5.2, 6.7 A, 178/5.4 CR, DIG. 25, 5.4 C

[56] References Cited

UNITED STATES PATENTS

| | | | |
|---|---|---|---|
| 3,392,233 | 7/1968 | Houghton | 178/6.6 A |
| 2,971,053 | 2/1961 | Gibson | 178/DIG. 25 |
| 2,969,425 | 1/1961 | Hughes | 178/5.4 R |

*Primary Examiner*—Richard Murray
*Attorney*—Frank R. Trifari

[57] ABSTRACT

A recording circuit for a simultaneous television signal divides the signal into different frequency bands. At least one of these bands has the vertical definition reduced to eliminate moire patterns upon playback, and then both bands are applied to a switch which converts them into a sequential signal for recording. The reduction in the vertical definition can occur before the frequency division.

14 Claims, 11 Drawing Figures

Patented April 24, 1973 3,729,579

4 Sheets-Sheet 1

Figures 1, 2:
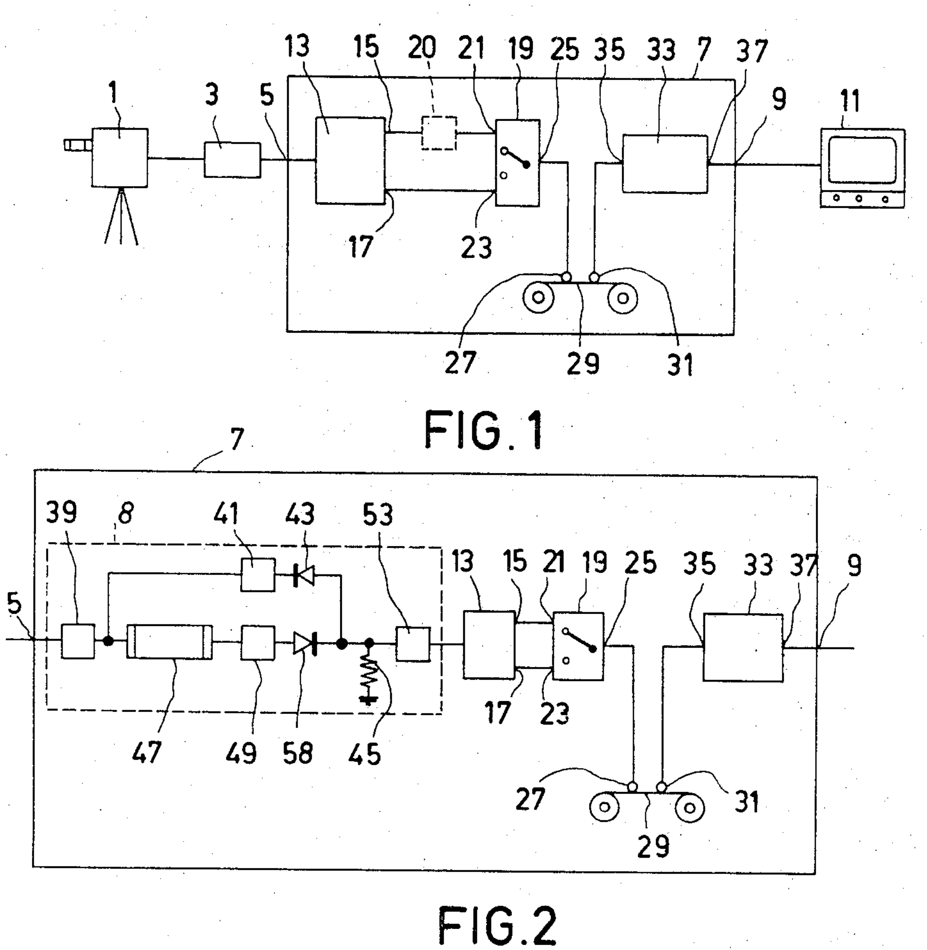

INVENTOR.
JACOB DE BOER
BY
Frank R. Trifari
AGENT

INVENTOR.
JACOB DE BOER
BY
Frank R. Trifari
AGENT

JACOB DE BOER INVENTOR.

BY

Frank R. Trifari

AGENT

INVENTOR.
JACOB DE BOER

BY

AGENT

CONVERTING CIRCUIT FOR A LINE-SEQUENTIAL TELEVISION SIGNAL RECORDING DEVICE

This application is a continuation of application Ser. No. 759, 703, filed 09/13/68, now abandoned.

The invention relates to a converting circuit for a line-sequentiel television signal recording device, more particularly a line-sequentiel video-taperecorder, for recording at least one original television signal analysed into original picture lines in groups of picture lines to be recorded upon a recording medium, more particularly a videotape, which converting circuit includes a sequence switching device for converting each original television signal into a television signal to be line-sequentially recorded, a different kind of information being obtained in at least two of the picture lines of a group of lines of the television signal to be recorded.

A recording device with such a converting circuit is known from German Pat. Application No. 1,126,443. In this known device, one picture line to be recorded of a television signal analysed into original picture lines contains the high-frequency part of the information from the corresponding picture line of the original television signal, whilst the subsequent picture line to be recorded contains the low-frequency part of the television signal of the corresponding original line. Each pair of these picture lines forms a group of picture lines to be recorded containing information to be recorded.

It has been found that, when a television signal recorded in this manner upon a recording medium is reproduced, interfering phenomena occur with brightness transitions sharply defined in vertical direction. For example, a plurality of unidirectional evenly spaced lines of the original scene making a small angle with the horizontal can be reproduced as a plurality of lines having an angle of inclination which is quite different from the original angle of inclination. Further, highly disturbing moire patterns may occur, especially with a spreading substantially horizontal pattern of lines.

The invention has for an object to reduce these disadvantages.

According to the invention, a converting circuit for a recording device of the kind set forth is characterized in that, viewed in the signal direction, it includes means preceding the sequence switching device, which serve to adapt substantially only the vertical definition of at least one kind of information to the maximum recordable vertical definition of this kind of information determined by the number of groups of lines per picture in the television signal to be recorded.

When using a converting circuit according to the invention, first substantially only the vertical definition of at least one kind of information in the television signal is reduced to at most the maximum definition corresponding to the number of line groups per picture. Subsequently, the television signal is made line-sequential and then recorded.

The Applicant has found that the interfering phenomena occurring in devices known hitherto were mainly due to the fact that the vertical definition in the line-sequential signal to be recorded per picture line was equal to that in the signal originally picked up. However the vertical definition per picture was reduced by the fact that a given kind of information occurred only once in each group of lines so that per picture line recorded this definition was unduly large. When using the converting circuit according to the invention, the aforesaid interfering phenomena are strongly reduced.

It should be noted that it is known from "Meinke and Gundlach": Taschenbuch der Hochfrequenztechnik, 1962, page 1,393, to eliminate interfering phenomena resulting from an unduly large picture definition in a television signal by reducing the bandwidth and hence mainly the horizontal definition of the signal. A television signal supplied to a line-sequential recording device has generally been treated in a manner described in the said quotation. However, if such a signal is line-sequentially recorded and is then reproduced again, the occurrence of the said disturbing phenomena can be avoided only by the step according to the invention. The invention is based on recognition of the fact that in the case of line-sequential recording, the disturbing phenomena can be reduced by only adapting the vertical definition, whilst the horizontal definition of the originally recorded picture lines can be maintained to a maximum so that the definition of the picture recorded is hardly adversely affected.

The invention will be described with reference to the drawings showing a few embodiments.

Figure 3:
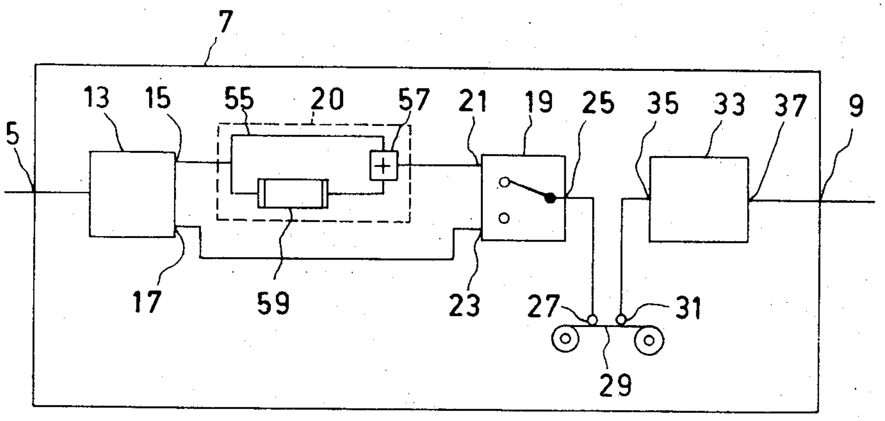
Figures 4, 5, 6:
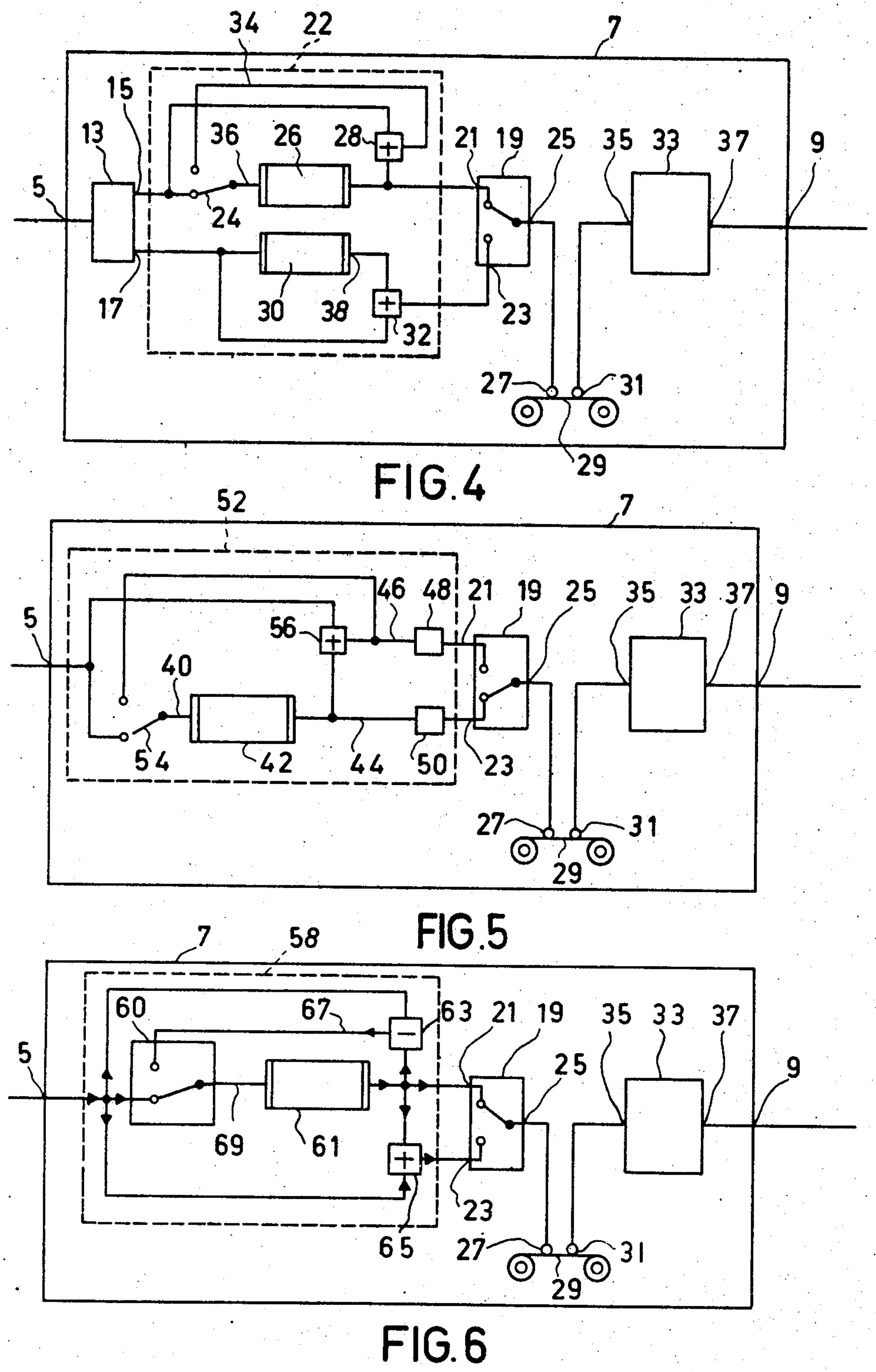
Figure 7:
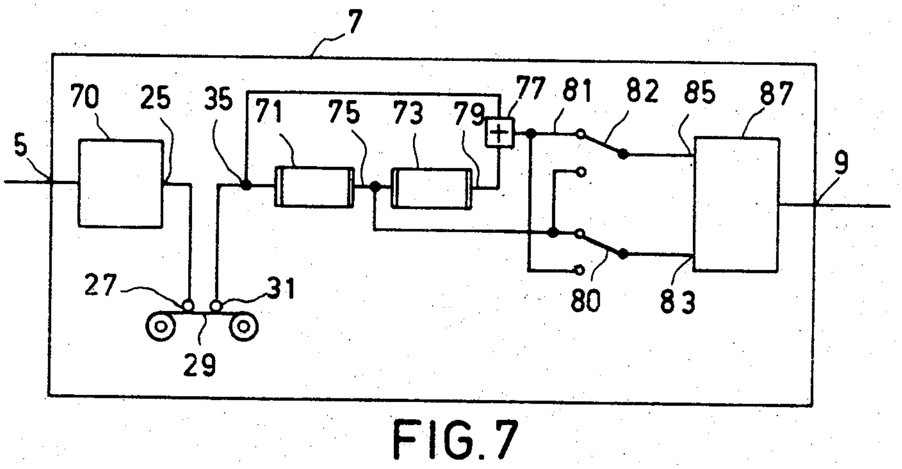
Figures 8, 9:
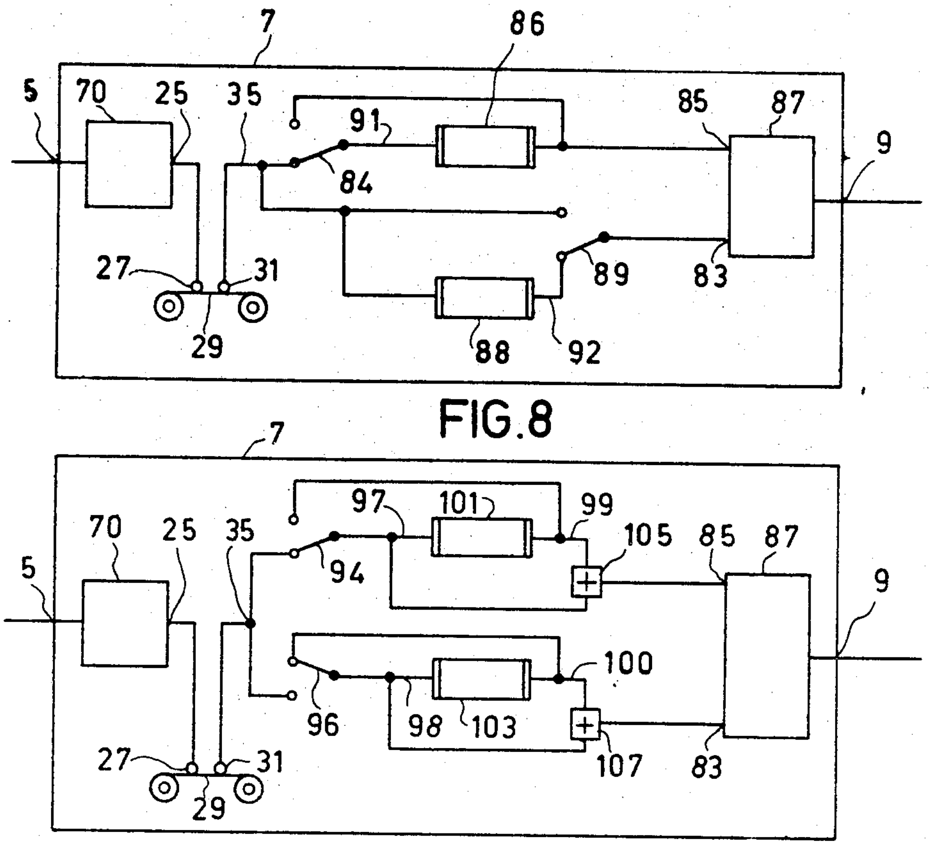
Figure 10:
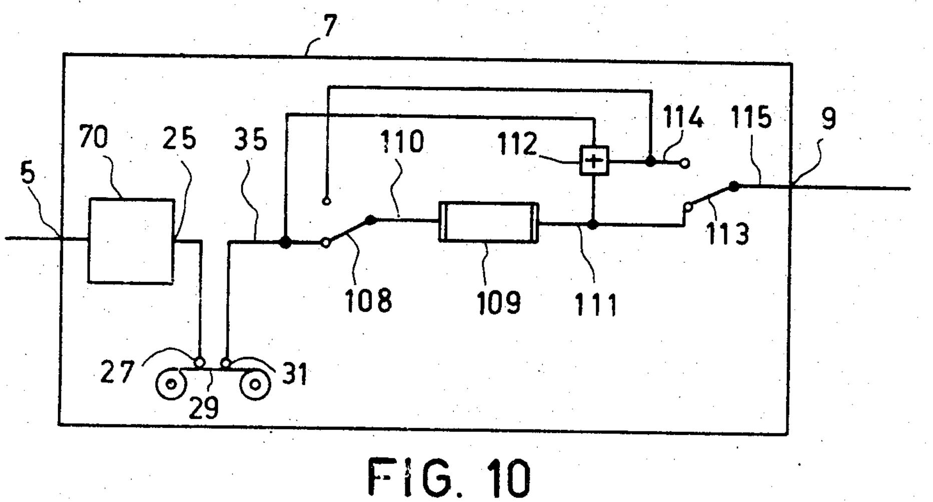
Figure 11:
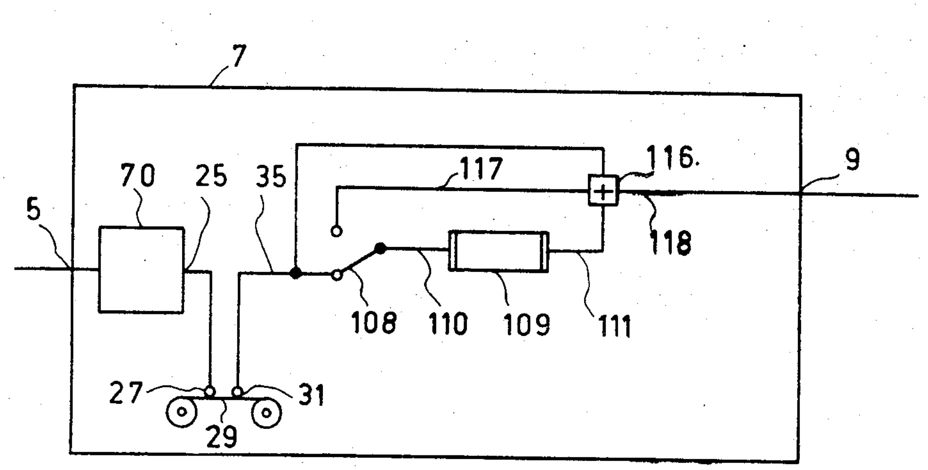

In the drawings:

FIG. 1 shows in a simplified blockdiagram a recording and reproducing system comprising a line-sequential television signal recording and reproducing device with a converting circuit according to the invention which at the recording end includes means for adapting the vertical definition in one kind of information to be recorded, FIG. 2 shows in a simplified blockdiagram a line-sequential television signal recording device with a converting circuit according to the invention which at the recording end includes an electronic spot wobbler, FIG. 3 shows in a simplified blockdiagram a line-sequential television signal recording device with a converting circuit according to the invention which at the recording end includes an adding- and delay circuit, FIG. 4 shows in a simplified blockdiagram a line-sequential television signal recording device with a converting circuit according to the invention for two kinds of information to be recorded, which at the recording end includes a delay- and adding circuit for each of the said kinds of information and a commutator which each time connects during a line period an output of a delay- and adding circuit to an input, FIG. 5 shows in a simplified blockdiagram a line-sequential television signal recording device with a converting circuit according to the invention which at the recording end includes a delay- and adding circuit provided with a commutator, FIG. 6 shows in a simplified blockdiagram a line-sequential television signal recording device with a converting circuit according to the invention for a colour television signal of the NTSC type, which at the recording end includes a delay- and adding circuit provided with a commutator and at the same time serving as a comb filter, FIG. 7 shows in a simplified blockdiagram a line-sequential television signal recording device with a converting circuit according to the invention which at the reproducing end includes a delay circuit which causes a delay by a number of line periods corresponding to the number of line periods of a group, FIG. 8 shows in a simplified block-diagram a line-sequential television signal recording device with a converting circuit according to the invention which at the reproducing end includes a delay circuit which causes a delay by a number of line periods corresponding to the number of line periods of a group, an input of the delay circuit being periodically connected during a line period to the output of this circuit through a commutator, FIG. 9 shows in a simplified blockdiagram a further development of the device shown in FIG. 8, in which an adding circuit is connected to the delay circuit, FIG. 10 shows in a simplified blockdiagram another development of a television signal recording device with a converting circuit according to the invention which at the reproducing end includes a delay- and adding circuit, an output of the delay circuit being periodically connected through a commutator to an input of this circuit, whilst a second commutator is connected to the output of the delay circuit through which the desired signal is supplied, FIG. 11 shows in a simplified blockdiagram a device similar to that shown in FIG. 10, in which the second commutator at the output of the delay circuit is dispensed with due to additional means included in the adding circuit.

For the sake of clarity, the parts which are not essential to the invention are not shown in the Figures.

In FIG. 1, a camera 1 is connected through a transmission system 3 to an input 5 of a line-sequential television signal recording device 7. An output 9 of the recording device 7 is connected to a display device 11.

The recording device 7 has a recording channel which viewed from the input 5, includes in order of succession a signal separator 13 having two outputs 15 and 17, a sequence switch 19 having two inputs 21 and 23 and an output 25, and a convertor 27. According to the invention, the input 21 of the sequence switch 19 is connected to the output 15 of the signal separator 13 through a device 20 preceding the sequence switch and serving to adapt only the vertical picture definition. The other output 17 of this signal separator 13 is connected to the input 23 of the line sequence switch 19.

The recording device 7 further includes a recording medium 29 which is displaceable along the convertor 27. The recording medium 29 is also displaceable along a convertor 31 which constitutes the beginning of a reproducing channel of the recording device 7.

The reproducing channel further includes a signal-processing device 33, one input 35 of which is connected to the convertor 31, whilst an output 37 is connected to the output 9 of the recording device 7.

The recording and reproducing system operates as follows. By means of the camera 1, a picture is recorded and converted into a television signal which is analysed into original picture lines and is applied through the transmission system 3 to the input 5 of the recording device 7. The transmission system 3 may comprise, for example, a transmitter and a receiver or only an amplifier or may constitute only a through connection (closed circuit). The television signal applied through the transmission system 3 to the input 5 of the recording device 7 may be a monochrome or a colour television signal. The television signal is separated in the signal separator 13 into two signals which each contain a different kind of information originating from the original television signal applied to the input of this device. In a device for recording a monochrome television signal, this signal is usually separated into a signal containing the high frequencies of the original television signal and a signal containing the low frequencies. In a device for recording a colour television signal, this signal is usually separated into a luminance signal and a chrominance signal. In a colour television signal recording device, the luminance signal appears at the output 15, whilst in a monochrome television signal recording device, the signal containing the low frequencies appears at this output and is applied through a device 20 for reducing the vertical definition to the input 21 of the sequence switch 19. The chrominance signal or the signal containing the high frequencies then appears at the output 17 and is applied to the input 23 of the sequence switch 19. By means of the sequence switch 19, during a line period the luminance signal and the chrominance signal or the signal containing the low frequencies and the signal containing the high frequencies are alternately passed on to the output 25. The television signal to be recorded appears at this output 25 and is recorded through the convertor 27 upon the recording medium.

According to the invention, the device 20 reduces the vertical definition in the relevant kind of information by combination of the information originating from points of the recorded picture located above each other with a number of successive lines of the original television signal before it passes the line sequence switch 19. The vertical definition of the relevant kind of information is then reduced to at the most the maximum value which may occur in the television signal to be recorded appearing at the output 25 of the sequence switch 19. This maximum recordable vertical definition in the television signal to be recorded is determined by the number of lines per recorded picture containing the relevant kind of information.

A few embodiments by means of which the vertical definition can be reduced will be described with reference to FIGS. 2 to 6.

Due to the said limitation in vertical definition of the original television signal, i.e. in front of the sequence switch, the information of one original picture line is distributed in vertical direction over a number of picture lines to be recorded. This results in a reduction of disturbing phenomena which occur during the reproduction of a line-sequentially recorded television signal, for example, of substantially horizontally extending lines in the picture recorded. The line-sequential recording in itself already reduces the vertical definition of the picture to be reproduced. When according to the invention the vertical definition is already reduced in front of the line sequence switch, the maximum attainable vertical definition of the recorded picture to be reproduced is not adversely affected, whilst yet the disturbing phenomena are strongly reduced so that the quality of the picture to be reproduced is materially improved.

A television signal recorded upon the recording medium 29 is reproduced through a convertor 31 which converts the information stored in the recording medium into electric signals which are applied through the input 35 to the signal-processing device 33. In the signal-processing device 33, the line sequence signal is brought into a form in which it can be reproduced through the picture reproducing device 11. In this operation, the signal is rendered simultaneous by means of a delay circuit, that is to say that every picture line to be reproduced contains information of every kind contained in the original television signal.

In a further embodiment of the invention, this delay circuit can be constructed so that the disturbing phenomena which have been considerably reduced at the recording end by the steps in accordance with the invention are now further reduced. FIGS. 7 to 11 show a few methods by which this may be achieved.

In FIG. 1, the device 20 for reducing the vertical definition is arranged in a signal path through which only one kind of information is transmitted. The device 20 may also be included in front of the signal separator 13 so that all the kind of information contained in the original television signal are reduced in vertical definition.

The construction of such a device and the nature of the television signal must then be adapted to one another.

It will be appreciated that the kind of recording medium used is not essential to the invention. The medium used is frequently in the form of a magnetizable tape; the recording device 7 then is a so-called video-taperecorder. The invention can be applied without taking further steps to a line-sequential recording device in which the signals are recorded, for example, on a photosensitive film.

The invention also relates to a device of which at least does not contain the proper recording means 27, 29 and 31. Such a device is called a converting circuit. In such a converting circuit the incoming signal can be converted into a signal adapted to be recorded on a usual recording device and if necessary to adapt the line sequential signal reproduced by such a recording device to a simultaneous signal.

The invention further relates to a line-sequential recording device for two pictures relatively independently recorded by means of two separate cameras, on a converting circuit therefore, in which during recording a line containing information from one picture alternates with a line containing information from the other picture. The aforesaid reduction in vertical definition according to the invention can be utilized successfully in this case. The separator 13 having outputs 15 and 17 is then omitted; the outputs 15 and 17 may each be an output of one of two recording systems of the type as designated in FIG. 1 by 1 and 3. Such a device can reproduce two pictures through two reproducing devices 11. In order to permit of transmitting the two pictures with little interference, a device 20 is required for reducing the vertical definition of each of the television signals.

FIG. 2 illustrates a recording device 7 including an electronic spot wobbler 8, in which the electronic spot wobbler 8 serves to reduce the vertical definition of the original television signal. The spot wobbler 8 comprises in order of succession, viewed from the input 5 of the recording device 7, a modulator 39, a parallel-combination of a direct signal path through a matching unit 41 and a positively connected diode 43 to one end of a resistor 45 and a delayed signal path through a delay device 47, a matching unit 49 and a positively connected diode 58 to the same end of the resistor 45. The other end of resistor 45 is connected to earth. The signal set up across resistor 45 is passed in the recording device 7 through a demodulator 53 to a signal separator 13. The signal separator 13 has two outputs 15 and 17 which are connected to inputs 21 and 23 of a line sequence switch 19. One output 25 of the line sequence switch 19 is connected to a convertor 27 along which is passed a recording medium 29. The recording medium is also passed along another convertor 31 which forms the beginning of a reproducing channel. This reproducing channel further includes a signal-processing device 33 having an input 35 and an output 37. The input 35 is connected to the convertor 31.

Parts of the circuit arrangement corresponding to those of FIG. 1 bear the same reference numerals, whilst for the sake of completeness reference is also made to this Figure as to the description of the operation of the circuit arrangement.

The operation of the electronic spot wobbler 8 will now be described more fully. A television signal appearing at the input 5 modulates a high-frequency carrier wave in the modulator 39. A signal set up across resistor 45 through the matching unit 41 and the diode 43 comprises the negative half cycles of the non-delayed modulated alternating voltage originating from the modulator 39. The amplitudes of these negative half cycles are determined by the amplitude of the non-delayed alternating voltage originating from the output of the modulator 39. Through the delay line 47, the matching unit 49 and the diode 51, a signal is set up across the resistor 45 which comprises the positive half cycles of the modulated alternating voltage delayed in the delay line 47 by one line period and originating from the modulator 39. If the frequency of the alternating voltage is coupled with the line frequency so that alternately a non-delayed negative half cycle and a delayed positive half cycle occur across the resistor 45, the modulation of the alternating voltage across the resistor 45 is equal to an average of the modulations produced in the modulator 39 in two successive lines. This results in a reduction in vertical definition of the modulation of the alternating voltage set up across resistor 45. This modulated alternating voltage is demodulated in the demodulator 53 and is separated by means of the signal separator 13 into signals of different nature which are applied to the line sequence switch 19. These signals are further processed in the recording device in the manner described with reference to FIG. 1.

In the electronic spot wobbler described above, the alternating voltage modulating the television signal is used at the same time as switching voltage for the diodes 43 and 51 serving as switches. It will be appreciated that the delayed and the non-delayed television signal of two successive lines may also be alternately scanned by means of a commutator actuated by means of a separate switching voltage.

In the case described, the vertical definition of the total television signal was reduced. For this purpose, the device 8 is connected in front of the signal separator 13. Alternatively, only one kind of information of the television signal may be reduced in vertical definition. The electronic spot wobbler 8 must then be located in one of the connections between the signal separator 13 and the sequence switch 19.

In FIG. 3, the device denoted by 20 in FIG. 1 for reducing the vertical definition of the picture is in the form of a delay- and adding device. Only the operation of this device will be described. Reference is further made to the description of FIG. 1, whilst corresponding parts are denoted by the same reference numerals.

The device 20 for reducing the vertical definition according to the invention is connected in front of the sequence switch 19 and includes a direct signal path 55 to an adding device 57 and a signal path through a delay line 59 causing a delay of one line period.

In the adding device 57, the average is determined of the television signals of each two successive lines of the kind obtained at the output 15 of the signal separator 13 (for example, the luminance signal of a colour television signal). Thus, the vertical definition of this signal is reduced to a value which is at the most equal to the value determined by the number of groups of lines per picture to be recorded. In this case, this number is half the number of lines per picture because the television signal is split only into two kinds of information which are alternately recorded upon the recording medium 29. Consequently, it is sufficient to determine the average for each two successive lines. When the television signal is split into three kinds of information which are alternately recorded, the average must be determined for at least three lines. The delay device 59 must then be adapted.

Without further explanation, it will be evident that the signal path including the delay line 59 must also include the means rendering the signal suitable to be transported through the delay line 59. This implies that, if the delay line 59 is of the type which only passes a given frequency range, the signal must first be transformed, for example by means of a modulator, to this frequency range and, after being transported through the delay line 59, may be retransformed. For the sake of simplicity, this will not be mentioned again because it is known to those skilled in the art.

In a further embodiment according to the invention, FIG. 4 includes a delay- and adding device 22, as a result of which the information in each of the picture lines of a group to be recorded originates from the same original picture lines. It has been found that the interference pattern can thus be further reduced. One of the two connections between the signal separator 13 and the sequence switch 19 for this purpose includes an additional delay of one line period. This additional delay can be obtained without the use of a separate delay line by providing a commutator between an output and an input of the delay line.

The construction and the operation of the device 22 for reducing the vertical picture definition included between the signal separator 13 and the sequence switch 19 will be described below. For the operation of the remaining part of the recording device reference is made to the other Figures in which corresponding parts are denoted by the same reference numerals.

The signal path between the output 15 of the signal separator 13 and the input 21 of the sequence switch 19 includes in order of succession a commutator 24, a delay device 26 causing a delay of one line period and an adding device 28. The signal path between the output 17 of the signal separator 13 and the input 23 of the sequence switch 19 includes a delay device 30 the input and the output of which are connected to an adding device 32.

The device included in the latter signal path is similar to the device 20 of FIG. 3.

The commutator 24 operates in synchronism with the sequence switch 19. The signals at various points in the device 22 will be plotted in a Table as a function of time in order to illustrate the effect of the device.

The output of the adding device 28 is therefore denoted by 34, the input of the delay line 26 by 36 and the output of the delay line 30 by 38.

The information appearing at the output 15 of the signal separator 13 is of the type A; the information at the output 17 of this separator is of the type B. The line periods are indicated by T1, T2 etc. During the period T1, A1 and B1 appear at the outputs 15 and 17, respectively; during the period T2; A2 and B2, etc.

As will be apparent from the Table, alternately a signal of the type A and of the type B appears at the output 25 of the sequence switch 19. This signal is an average of the signals during the same line periods of the original television signal. For example, at the output 25 B1 + B2 is followed by A1 + A2, etc.

The signal appearing at the output 25 is processed in the manner already described with reference to FIG. 1.

FIG. 5 illustrates a delay- and adding device 52 for reducing the vertical picture definition. Parts corresponding to those of the preceding Figures are denoted by the same reference numerals, whilst for the operation thereof reference is made to said Figures.

The circuit arrangement includes a commutator 54 connected between an output 44 and an input 40 of a delay device 42. The commutator 54 operates in synchronism with the sequence switch 19. The output 44 of the delay device 42 is connected to one of the two inputs of the commutator 54 through an adding device 56 to which also the input 5 is connected. The other input of the commutator 54 is connected to the input 5. A signal is taken both from the output 44 of the delay device 42 and from an output 46 of the adding device 56 and is applied through filters 50 and 48, respectively, to the inputs 23 and 21, respectively, of the sequence switch 19.

In the Table below, the signals appearing at various instants at various points in the circuit arrangement are illustrated in the same manner as in FIG. 4.

| | T1 | T2 | T3 | T4 | T5 | T6 | T7 | T8 |
|---|---|---|---|---|---|---|---|---|
| 5 | A1+B1 | A2+B2 | A3+B3 | A4+B4 | A5+B5 | A6+B6 | A7+B7 | A8+B8 |
| 40 | A1+A1 | A1 + A2 + B1+B2 | A3+B3 | A3+A4 + B3+B4 | A5+B5 | A5+A6 + B5+B6 | A7+B7 | A7+A8 + B7+B8 |
| 44 | | A1+B1 | A1+A2 + B1+B2 | A3+B3 | A3+A4 + B3+B4 | A5+B5 | A5+A6 + B5+B6 | A7+B7 |
| 46 | | A1+A2 + B1+B2 | A1+A2+A3 + B1+B2+B3 | A3+A4 + B3+B4 | A3+A4+A5 + B3+B4+B5 | A5+A6 + B5+B6 | A5+A6+A7 + B5+B6+B7 | A7+A8 + B7+B8 |

| | T1 | T2 | T3 | T4 | T5 | T6 | T7 | T8 |
|---|---|---|---|---|---|---|---|---|
| 21 | | A1+A2 | A1+A2+A3 | A3+A4 | A3+A4+A5 | A5+A6 | A5+A6+A7 | A7+A8 |
| 23 | | B1 | B1+B2 | B3 | B3+B4 | B5 | B5+B6 | B7 |
| 25 | | A1+A2 | B1+B2 | A3+A4 | B3+B4 | A5+A6 | B5+B6 | A7+A8 |

It is apparent from the Table that alternately a sum signal of the type A and of the type B appears at the output 25 of the line sequence switch, which signals both originate from the same two original picture lines.

The filter 50 is open to a signal containing the information of the type B, whilst the filter 48 is open to a signal of the type A. The total television signal supplied to the input 5 contains information both of the type A and of the type B.

In this case, in a favourable construction of a further embodiment of the invention, the result obtained with one delay line is the same as that obtained in the embodiment of FIG. 4 which required two delay lines.

FIG. 6 shows a television signal recording device 7 according to the invention which includes a delay- and adding device 58. The parts corresponding to those of the preceding Figures are denoted by the same reference numerals. For the operation of these parts, reference is made to the description of FIG. 1.

The recording device 7 can be used for line-sequentially recording upon the recording medium 29 alternately a chrominance information signal and a luminance signal of a colour television signal of the NTSC type. The delay- and adding device 58 includes a commutator 60, a delay device 61 and two adding devices 63 and 65. The commutator 60 operates in synchronism with the sequence switch 19 and alternately connects the input 5 of the recording device 7 and an output 67 of the adding device 63 to an input 69 of the delay device 61. The delay device 61 causes a delay of one line period. An output of the delay device 61 is connected to the input 21 of the sequence switch 19 and to an input of the adding device 63 as well as to an input of the adding device 65. The other inputs of the adding devices 63 and 65 are connected to the input 5 of the recording device 7. The adding device 63 is connected so that the signals applied to its inputs are subtracted from each other, whilst the adding device 65 is connected so that the signals applied to its inputs are added together.

The output of the adding device 65 is connected to the input 23 of the sequence switch 19.

In the Table below, the signals appearing at various instants at various points of the circuit arrangement are indicated in the same manner as in the case of FIG. 4.

| | T1 | T2 | T3 | T4 | T5 | T6 |
|---|---|---|---|---|---|---|
| 5 | (A1+B1) | (A2+B2) | (A3+B3) | (A4+B4) | (A5+B5) | (A6+B6) |
| 67 | | (A2+B2)<br>−(A1+B1) | (A3+B3)<br>−(A2+B2)<br>+(A1+B1) | (A4+B4)<br>−(A3+B3) | (A5+B5)<br>−(A4+B4)<br>+(A3+B3) | (A6+B6)<br>−(A5+B5) |
| 69 | (A1+B1) | (A2+B2)<br>−(A1+B1) | (A3+B3) | (A4+B4)<br>−(A3+B3) | (A5+B5) | (A6+B6)<br>−(A5+B5) |
| 21 | | (A1+B1) | (A2+B2) | (A3+B3) | (A4+B4) | (A5+B5) |
| 23 | | (A2+B1)<br>+(A2+B2) | −(A1+B2)<br>−(A1+B1)<br>+(A2+B2)<br>+(A3+B3) | (A3+B3)<br>+(A4+B4) | −(A3+B3)<br>−(A3+B3)<br>+(A4+B4)<br>+(A5+B5) | (A5+B5)<br>+(A6+B6) |
| 25 | | (A1+A2)<br>+(B1+B2) | (A2−A1)<br>+(B2−B1) | (A3+A4)<br>−(B3−B4) | (A4−A3)<br>+(B4−B3) | (A5+A6)<br>+(B5+B6) |

It appears from the Table that the signal to be recorded appearing at the output 25 of the sequence switch 19 alternately contains the sum signal of two original picture lines and the difference signal of the same two original picture lines. In the case of a colour television signal of the NTSC type, the chrominance information signal modulates a subcarrier the frequency of which is $(n + 1/2)\,x$ the line frequency. If An is the luminance signal and Bn is the chrominance information signal of such a colour television signal during the line period Tn, at the output 25 $B_{n-1}+B_n$ is always approximately equal to 0 and $A_{n-1}-A_{n-2}$ approximately equal to 0, that is to say that at the output 25 alternately appears the luminance information and the chrominance information the vertical picture definition of which is reduced and which moreover originate from the same original picture lines.

FIGS. 7 to 11 show further embodiments of the reproducing portion of a recording device in accordance with the invention.

In the convention line-sequential recording devices ,a delay device causing a delay of one line period is used for the reproduction of a recorded signal containing, for example, two line-sequentially recorded types of information, i.e., alternately of the type C and of the type D. By means of a commutator, a signal of the type C and a signal of the type D can then be obtained simultaneously at any instant.

Every other line period, however, the combination of the order of succession of the line periods and of the signals of the types C and D originating from the recorded signal is then varied. For example, in a given line period, the signals C1 and D2, in the subsequent line period the signals C3 and D2, in the subsequent line period the signals C3 and D4 and then the signals C5 and D4 etc. appear simultaneously. The subscripts 1, 2, 3 etc. indicate the recorded line period from which the relevant signal originates. In a further embodiment according to the invention, it has been found that the disturbance, which due to the reduction in vertical definition by the steps described hereinbefore was already considerably reduced, can be further reduced by avoiding as far as possible the variation in the order of succession of the simultaneously appearing signals. This may be achieved by the use of a delay device causing a delay of a number of line periods which is equal to the number of line periods of a group of picture lines, i.e., equal to the number of line-sequentially recorded types of information.

In FIG. 7, a recording device 7 has an input 5 for supplying the television signal to be recorded. The signal supplied to the input 5 is applied through a simultaneous-to-sequential convertor 70 and an output 25 thereof to a convertor 27. The television signal is recorded upon a recording medium 29 by the convertor 27. The simultaneous-to-sequential convertor 70 includes a device for reducing the vertical picture definition in accordance with the invention, for example, as described with reference to one of FIGS. 1 to 6.

A line-sequential television signal recorded upon the recording medium 29 is taken from the medium by a convertor 31 and converted again into an electric signal. This signal is applied to an input 35 of a delay device having two delay lines 71 and 73, an adding device 77 and two commutators 80 and 82. The signal applied through the input 35 appears at an input of the adding device 77 and at the input of the delay line 71. Another input 79 of the adding device 77 is connected through the delay line 73 to an output 75 of the delay line 71. The signal applied to the input 35 appears with a delay of one line period at the output 75 and is applied to an input of the commutators 80 and 82. A signal appears at the output 81 of the adding device, which signal is half the sum of a non-delayed signal and of a signal delayed by two line periods. This average signal is applied to the other inputs of the commutators 80 and 82. Each of the commutators 80 and 82 has an output which is connected to an input 83 and 85, respectively, of an adding device 87. In the adding device 87, the signals are brought into a form in which they can be reproduced and are then supplied to an output 9.

In the Table below, the signal types are indicated which occur at various points during various line periods in the reproducing portion of the recording device 7, starring from two signal types C and D which were line-sequentially recorded.

| | T1 | T2 | T3 | T4 | T5 | T6 | T7 |
|---|---|---|---|---|---|---|---|
| 35 | C1 | D2 | C3 | D4 | C5 | D6 | C7 |
| 75 | | C1 | D2 | C3 | D4 | C5 | D6 |
| 79 | | | C1 | D2 | C3 | D4 | C5 |

| | T1 | T2 | T3 | T4 | T5 | T6 | T7 |
|---|---|---|---|---|---|---|---|
| 81 | | | C1+C3/2 | D2+D4/2 | C3+C5/2 | D4+D6/2 | C5+C7/2 |
| 83 | | | D2 | D2+D4/2 | D4 | D4+D6/2 | D6 |
| 85 | | | C1+C3/2 | C3 | C3+C5/2 | C5 | C5+C7/2 |

It is apparent from the Table that in two successive line periods each type of information from the same recorded picture lines appears at the outputs 83 and 85. For example, D2 and C3 are present both during T3 and during T4. C3 and D4 occur during T4 and T5, whilst D4 and C5 are present during T5 and T6, etc. The interference pattern already reduced due to the reduction in vertical picture definition according to the invention is found to be still further reduced in this further embodiment of the recording device in accordance with the invention. The reduction of interference is promoted by averageing the signals with the aid of the adding device 77.

The parts of FIG. 8 corresponding to those of FIG. 7 are denoted by the same reference numerals. For their description, reference is made to FIG. 7.

The delay device of this embodiment is of a construction different from that of the preceding embodiment. The signal to be reproduced is supplied from the input 35 to an input of a commutator 84, an input of a commutator 89 and an input of a delay line 88. The other inputs of the commutators 84 and 89 are connected to an output of a delay line 86 and to an output of a delay line 88, respectively. The said output of the delay line 86 is connected to the input of the adding device 87. An input 91 of the delay line 86 is connected to an output of the commutator 84. The input 83 of the adding device 87 is connected to an output of the commutator 89. Like in the case of FIG. 7, the Table below indicates the signal types occurring at the respective instants at the points of the circuit arrangement denoted by reference numerals.

| | T1 | T2 | T3 | T4 | T5 | T6 | T7 |
|---|---|---|---|---|---|---|---|
| 35 | C1 | D2 | C3 | D4 | C5 | D6 | C7 |
| 91 | C1 | C1 | C3 | C3 | C5 | C5 | C7 |
| 85 | | C1 | C1 | C3 | C3 | C5 | C5 |
| 92 | | C1 | D2 | C3 | D4 | C5 | D6 |
| 83 | | D2 | D2 | D4 | D4 | D6 | D6 |

It is apparent from the Table that during the line period T2 the signal C1 appears at the input 85 and the signal D2 appears at the input 83. This situation still persists during the line period T3. During the line period T4 the signal C3 at the input 83 appears simultaneously with the signal D4 at the input 85. It is thus apparent that the order of succession of the line periods from which the different signal types originate remains unchanged during the sequential-to-simultaneous conversion, which results, as stated, in a further reduction of the interference pattern.

The parts of FIG. 9 corresponding to those of FIG. 7 are denoted by the same reference numerals. For their description, reference is made to FIG. 7.

The delay device in which the sequential-to-simultaneous conversion takes place is differently constructed between the input 35 and the inputs 83 and 85. The input 35 is connected to inputs of two commutators 94 and 96. The other inputs of these commutators 94 and 96 are connected to outputs 99 and 100, respectively, of delay lines 101 and 103, respectively. The outputs 99 and 100 are further connected to inputs of adding devices 105 and 107, respectively, and to the other inputs of the commutators 94 and 96, respectively. The output 97 of the commutator 94 is connected to an input of the delay line 101 and to an input of the adding device 105. An output 98 of the commutator 96 is connected to an input of the delay line 103 and to an input of the adding device 107.

Like in the case of FIG. 7, the Table below indicates the signals occurring in different line periods at different points of the circuit arrangement.

| | T1 | T2 | T3 | T4 | T5 | T6 | T7 | T8 |
|---|---|---|---|---|---|---|---|---|
| 35 | C1 | D2 | C3 | D4 | C5 | D6 | C7 | D8 |
| 97 | C1 | C1 | C3 | C3 | C5 | C5 | C7 | C8 |
| 98 | | D2 | D2 | D4 | D4 | D6 | D6 | D8 |
| 99 | | C1 | C1 | C3 | C3 | C5 | C5 | C7 |
| 100 | | | D2 | D2 | D4 | D4 | D6 | D6 |
| 83 | | | 2D2 | D2+D4 | 2D4 | D4+D6 | 2D6 | D6+D8 |
| 85 | | 2C1 | C1+C3 | 2C3 | C3+C5 | 2C5 | C5+C7 | 2C7 |

It is apparent from the Table that during T3 and T4 D2 and C3 appear simultaneously at the inputs 83 and 85, during T5 and T6 D4 and C5, etc. When this order of succession is maintained in at least part of the signal, the disturbing phenomena, which have disappeared for the major part due to the reduction of the vertical picture definition according to the invention, can be still further reduced. This reduction is promoted when the average of the signal types is determined every other line period.

FIG. 10 and 11 show embodiments of recording devices the reproducing portions of which each include a delay device causing a delay of only one line period. An output signal of the delay line is recorded again with the aid of a commutator. Thus, yet a delay of two line periods is obtained which is required for a line-sequential signal containing two types of information in order that the order of succession during reproduction may be maintained.

The parts of FIG. 10 corresponding to those of FIG. 7 are denoted by the same reference numerals. For their description, reference is made to FIG. 7.

The input 35 of the sequential-to-simultaneous convertor is connected to an input of a commutator 108 and to an input of an adding device 112. The other input of the commutator 108 is connected to an output 114 of the adding device 112. The other input of the adding device 112 is connected to an output 111 of a delay device 109. The delay device 109 causes a delay of one line period. The input 110 of the delay device 109 is connected to the output of the commutator 108. The outputs 111 of the delay device 109 and 114 of the adding device 112 are each connected to an input of a commutator 113. The output 115 of the commutator 113 is connected to the output 9 of the television signal recording device 7.

Like in the case of FIG. 7, the Table below indicates the signals occurring during different line periods at different points of the recording device.

| | T1 | T2 | T3 | T4 | T5 | T6 | T7 | T8 |
|---|---|---|---|---|---|---|---|---|
| 35 | C1 | D2 | C3 | D4 | C5 | D6 | C7 | D8 |
| 110 | C1 | C1+D2 | C3 | C3+D4 | C5 | C5+D6 | C7 | C7+D8 |
| 111 | | C1 | C1+D2 | C3 | C3+D4 | C5 | C5+D6 | C7 |
| 114 | | C1+D2 | C1+C3+D2 | C3+D4 | C3+C5+D4 | C5+D6 | C5+C7+D6 | C7+D8 |
| 115 | | C1+D2 | C1+D2 | C3+D4 | C3+D4 | C5+D6 | C5+D6 | C7+D8 |

It is apparent from this Table that the combined order of succession of the sequential signals C and D originating from successive recorded lines remains unchanged, which results in a further reduction of the disturbing phenomena.

The parts of FIG. 11 corresponding to those of FIG. 10 are denoted by the same reference numerals so that for their description reference is made to this Figure. The commutator 113 of FIG. 10 has been omitted in this case. Instead the adding device 112 is provided with two outputs 117 and 118 and is denoted in this Figure by 116. The output 117 of the adding device 116 is connected to an input of the commutator 108. The output 118 is directly connected to the output 9 of the recording device 7. The signals applied to the inputs 35 and 111 of the adding device 116 appear at the outputs 117 and 118 in relatively different amplitude ratios. For this purpose, the adding device 116 is constructed so that the signal of the type C is passed from the input 35 to the output 118 as well as from the input 111 to the output 117 in a two times weaker form than the signal of the type D and than the signals of the type C and of the type D passed from the inputs 35 and 111, respectively, to the outputs 117 and 118, respectively.

Like in the case of FIG. 7, the Table below indicates the signals occurring during different line periods at different points of the recording device.

| | T1 | T2 | T3 | T4 | T5 | T6 | T7 | T8 |
|---|---|---|---|---|---|---|---|---|
| 35 | C1 | D2 | C3 | D4 | C5 | D6 | C7 | D8 |
| 110 | C1 | ½C1+D2 | C3 | ½C3+D4 | C5 | ½C5+D6 | C7 | ½C7+D8 |
| 111 | | C1 | ½C1+D2 | C3 | ½C3+D4 | C5 | ½C5+D6 | C7 |
| 117 | | ½C1+D2 | ¼C1+C3+D2 | ½C3+D4 | ¼C3+C5+D4 | ½C5+D6 | ¼C5+C7+D6 | ½C7+D8 |
| 118 | | C1+D2 | ½(C1+C3)+D2 | C3+D4 | ½(C3+C5)+D4 | C5+D6 | ½(C5+C7)+D6 | C7+D8 |

It is apparent from the Table that during the period T2 the order of succession in the output signal at the output 118 is C1, D2. This order of succession C1, D2 also exists during the period T3 at the point 118. However, also the signal of the type C is averaged over two line periods ($1/2C1 + 1/2C3$) occurring before and after T2 which contains D2 in the recorded signal. When the correct order of succession is maintained and the average is determined, the interference phenomena in the picture reproduced by means of the signal obtained at the output 118 are further reduced.

In the description of the embodiments, details supposed to be known to those skilled in the art have been left out, such as, for example, the form in which the signals have to pass the delay devices, the recording and further treatment of the signal and all the problem involved.

Where in the foregoing the terms "adding" and "averageing" have been used, it will be clear to those skilled in the art that in general, for example, also a so-called "weighted" averageing can be effected, if desired over several line periods.

It will further be appreciated that a group of recorded picture lines may consist of more than two; for those skilled in the art, the date mentioned in the description of the invention are sufficient to know what steps should be taken in these cases.

What is claimed is:

1. A circuit for converting a simultaneous television signal of a selected line frequency comprising means for reducing the vertical definition of at least a component of said simultaneous signal thereby to produce a modified signal; and a first switch means coupled to said reducing means to receive said modified signal for converting said modified signal into a sequential signal, said switch operating at and synchronized with said line frequency, whereby said modified sequential signal is adapted to be recorded and reconverted upon playback into a simultaneous signal without interference effects.

2. A circuit as claimed in claim 1 wherein said switch means comprises two input means for receiving different components of said simultaneous signal respectively, at least one of said inputs being coupled to said reducing means, and an output means for supplying said sequential signal.

3. A circuit as claimed in claim 2 wherein said reducing means comprises an electronic spot wobbler circuit.

4. A circuit as claimed in claim 3 wherein said wobbler comprises a modulator having an input coupled to receive said simultaneous signal source and an output, a delay line having a time delay equal to one horizontal line coupled to said modulator output, a first diode coupled to said delay line, a second diode poled opposite to said diode coupled to said modulator output, means for combining the outputs of said diodes, and a demodulator.

5. A circuit as claimed in claim 2 wherein said reducing means comprises a delay line having a time delay of one horizontal line and having an input coupled to receive said simultaneous signal and an output; and an adder having inputs coupled to receive said simultaneous signal and said delay line output respectively, and an output coupled to said switch.

6. A circuit as claimed in claim 2 wherein said reducing means comprises a second switch operated in synchronism with said first switch and having first and second input means, one of said inputs being coupled to receive said simultaneous signal and an output; a delay line having an input coupled to said second switch output and an output; an adder having inputs coupled to said delay line output and to receive said simultaneous signal respectively, and an output coupled to the remaining second switch input.

7. A circuit as claimed in claim 6 further comprising a pair of filters having inputs coupled to said adder and delay line outputs respectively, and outputs coupled to said first switch inputs respectively.

8. A circuit as claimed in claim 2 wherein said reducing means comprises a second switch synchronized with said first switch and having two inputs and an output, one of said inputs being coupled to receive said simultaneous signal; a delay line having an input coupled to said second switch output and an output coupled to one of said first switch inputs; a subtraction circuit having inputs coupled to said delay line output and to receive said simultaneous signal respectively, and an output coupled to the remaining input of said second switch; an adder circuit having inputs coupled to receive said simultaneous signal and to said delay line output respectively, and an output coupled to the remaining input of said first switch.

9. A circuit as claimed in claim 2 further comprising a recording medium, recording and reproducing transducers coupled to said medium, said recording transducer being coupled to said first switch output, and a sequential to simultaneous translator coupled to said reproducing transducer.

10. A circuit as claimed in claim 9 wherein said translator comprises first and second serially coupled in the order recited delay lines, each having an input and an output; a first adder having a first input coupled to said first delay line input and said reproducing transducer, a second input coupled to said second delay line output, and an output; second and third switches each having first and second inputs and an output; said first input of said second switch being coupled to said adder output and said second input of said third switch; said second input of said second switch being coupled to said first input of said third switch and to the junction of said delay lines; a second adder having two inputs coupled to said outputs of said second and third switches respectively, and an output means for providing a reproduced simultaneous signal.

11. A circuit as claimed in claim 9 wherein said translator comprises first and second delay lines each having an input and an output; second and third switches each having two inputs and an output; said second switch output being coupled to said first delay line input; said second switch second input being coupled to said reproducing transducer and said third switch first input, said second delay line output being coupled to said third switch second input; an adder having two inputs and an output means for providing said simultaneous signal; said first adder input being coupled to said first delay line output and said second switch first input; and said second adder input being coupled to said third switch output.

12. A circuit as claimed in claim 9 wherein said translator comprises second and third switches each having a first input, a second input coupled to said reproducing transducer, and an output; first and second delay lines each having an input coupled to said second and third switch outputs respectively, and an output coupled to said second and third switch first inputs respectively, first and second adders each having a first input coupled to said first and second delay line inputs respectively, a second input coupled to said first and second delay line outputs respectively, and an output; and a third adder having two inputs coupled to said first and second adder outputs respectively, and an output means for providing a reproduced simultaneous signal.

13. A circuit as claimed in claim 9 wherein said translator comprises second and third switches each having first and second inputs and an output; a delay line having an input coupled to said second switch output, and an output; an adder having first input coupled to said second switch second input and said reproducing transducer, a second input coupled to said delay line output and said third switch second input, and an output coupled to said first inputs of said second and third switches.

14. A circuit as claimed in claim 9 wherein said translator comprises a second switch having two inputs and an output; a delay line having an input coupled to said second switch output, and an output; an adder having two inputs and two outputs; said first adder input being coupled to said reproducing transducer and said second switch second input; said second adder input being coupled to delay line output; said first adder output being coupled to said second switch first input; and said second adder output providing a reproduced simultaneous signal.

* * * * *